US009711065B2

(12) United States Patent
Yu et al.

(10) Patent No.: US 9,711,065 B2
(45) Date of Patent: Jul. 18, 2017

(54) RESPONSIVE DYNAMIC THREE-DIMENSIONAL TACTILE DISPLAY USING HYDROGEL

(71) Applicants: Hongyu Yu, Chandler, AZ (US);
Rogier Windhorst, Mesa, AZ (US);
Debra Baluch, Chandler, AZ (US);
Hanqing Jiang, Chandler, AZ (US);
Lenore Dai, Phoenix, AZ (US)

(72) Inventors: Hongyu Yu, Chandler, AZ (US);
Rogier Windhorst, Mesa, AZ (US);
Debra Baluch, Chandler, AZ (US);
Hanqing Jiang, Chandler, AZ (US);
Lenore Dai, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 112 days.

(21) Appl. No.: 14/443,857

(22) PCT Filed: Nov. 20, 2013

(86) PCT No.: PCT/US2013/070969
§ 371 (c)(1),
(2) Date: May 19, 2015

(87) PCT Pub. No.: WO2014/081808
PCT Pub. Date: May 30, 2014

(65) Prior Publication Data
US 2015/0302772 A1  Oct. 22, 2015

Related U.S. Application Data

(60) Provisional application No. 61/728,442, filed on Nov. 20, 2012.

(51) Int. Cl.
*G06F 3/041* (2006.01)
*G09B 21/00* (2006.01)
(Continued)

(52) U.S. Cl.
CPC .......... *G09B 21/004* (2013.01); *G06F 3/016* (2013.01); *G06F 3/0202* (2013.01);
(Continued)

(58) Field of Classification Search
CPC . G06F 3/02; G06F 3/041; G06F 3/045; G06F 3/042; G09G 5/00; B29C 65/00;
(Continued)

(56) References Cited

U.S. PATENT DOCUMENTS 5,878,154 A    3/1999  Schimmelpfennig
6,430,450 B1   8/2002  Bach-y-Rita et al.
(Continued)

FOREIGN PATENT DOCUMENTS

WO    0126708 A1    4/2001

OTHER PUBLICATIONS

Yong Qiu et al.; Environment-Sensitive Hydrogels for Drug Delivery; 53 Advanced Drug Delivery Reviews 321-339 (2001).
(Continued)

*Primary Examiner* — Pegeman Karimi
(74) *Attorney, Agent, or Firm* — Quarles & Brady LLP (57) ABSTRACT

A dynamic and refreshable three-dimensional tactile display uses stimulus sensitive hydrogel blocks as pixels to create a touch surface with elevations from a two-dimensional optical image or from stored data. The movable three-dimensional tactiles are powerful in teaching Science, Technology, Engineering, and Mathematics (STEM) materials to visually impaired and blind students.

11 Claims, 10 Drawing Sheets

(51) Int. Cl.
*G06F 3/01* (2006.01)
*G06F 3/0488* (2013.01)
*G06F 3/02* (2006.01)
*G06F 3/14* (2006.01)

(52) U.S. Cl.
CPC ........ *G06F 3/0488* (2013.01); *G06F 3/04886* (2013.01); *G06F 3/14* (2013.01); *G06F 2203/04809* (2013.01)

(58) Field of Classification Search
CPC ........... B32B 27/00; B32B 37/00; G08B 6/00; H04B 3/36
See application file for complete search history.

(56) References Cited

U.S. PATENT DOCUMENTS

| | | | |
|---|---|---|---|
| 7,474,180 | B2 | 1/2009 | Bintoro et al. |
| 7,482,381 | B2 | 1/2009 | Dannert et al. |
| 7,648,619 | B2 | 1/2010 | Chuang et al. |
| 7,988,685 | B2 | 8/2011 | Ziaie et al. |
| 2002/0068295 | A1 | 6/2002 | Madou et al. |
| 2005/0003517 | A1 | 1/2005 | Ragless |
| 2006/0169339 | A1 | 8/2006 | Oh et al. |
| 2008/0138774 | A1* | 6/2008 | Ahn ................... G09B 21/003 434/114 |
| 2008/0303796 | A1* | 12/2008 | Fyke ..................... G06F 3/0236 345/173 |
| 2009/0033617 | A1* | 2/2009 | Lindberg ............... G06F 3/016 345/156 |
| 2010/0151426 | A1 | 6/2010 | Tachi et al. |
| 2010/0162109 | A1* | 6/2010 | Chatterjee .............. G06F 3/016 715/702 |
| 2010/0182245 | A1* | 7/2010 | Edwards ................ G06F 3/041 345/173 |
| 2011/0157080 | A1* | 6/2011 | Ciesla .................. G06F 3/0202 345/174 |
| 2012/0078330 | A1 | 3/2012 | Doerr |
| 2012/0133494 | A1* | 5/2012 | Cruz-Hernandez ..... G06F 3/016 340/407.2 |

OTHER PUBLICATIONS

Hugo Almeida et al.; Temperature and pH Stimuli-Responsive Polymers and Their Applications in Controlled and Self-Regulated Drug Delivery; 02 J. App. Pharm. Science 01-10 (2012).
Antonio Baldi et al.; A Microstructured Silicon Membrane with Entrapped Hydrogels for Environmentally-Sensitive Fluid Gating; submitted to Sensors & Actuators (2006).
International Search Report and Written Opinion as mailed on Feb. 28, 2014 for International Application No. PCT/US2013/070969.

* cited by examiner

Fig. 2A Galaxy optical image

RESPONSIVE DYNAMIC THREE-DIMENSIONAL TACTILE DISPLAY USING HYDROGEL

CROSS-REFERENCE TO RELATED APPLICATIONS

This application represents the national stage entry of PCT International Application No. PCT/US2013/070969 filed Nov. 20, 2013, which claims priority from U.S. Provisional Patent Application No. 61/728,442 filed on Nov. 20, 2012, the disclosures of which are incorporated by reference here in their entirety for all purposes.

STATEMENT REGARDING FEDERALLY SPONSORED RESEARCH

Not Applicable.

FIELD OF THE INVENTION

The invention relates to a dynamic and refreshable three-dimensional tactile display that uses stimulus sensitive hydrogel blocks as pixels that create a touch surface with elevations from a two-dimensional optical image.

BACKGROUND OF THE INVENTION

Images are visual content. For this information to become accessible to the blind or visually-impaired, there must be a conversion of a visual image into alternative sensory data. A conversion into some tactile form has been the most popular alternative.

Tactile literacy is critical to enhance the social and physical capabilities of people who are blind, to help them pursue higher levels of education in Science, Technology, Engineering, and Mathematics (STEM) fields and other areas of post-secondary education that require basic STEM literacy, and ultimately obtain professional level employment in STEM fields or other professional disciplines.

There are numerous prior studies related to the task of making visual information accessible in tactile forms for the blind population. To date, research on haptic object processing has dealt almost exclusively with inanimate objects. Many of the early studies in this field during the 1960s and 1970s addressed the processing of geometric properties, particularly their shape and size, using the haptic and visual systems. The haptic system performed quite poorly in those studies. More recent studies have investigated how well blind-folded sighted, visually-impaired, and blind observers can identify common objects at the basic level, as depicted in raised-line drawings. Accuracy has varied from very poor in open-set identification to very good with small closed sets and/or when observers were initially primed with the superordinate category represented by the drawing. Corresponding mean response times, however, have been consistently high—for example, ranging from 30 to 71 seconds across various conditions in one study, and 90 seconds or more in other experiments.

In contrast—Tadoma—a method used by deaf-blind individuals to understand spoken speech by statically contacting faces in real time, serves as an existence proof that the haptic system can process complex information both accurately and quickly. Reports have documented highly efficient haptic performance. They required blind-folded participants to haptically explore and identify an open set of 100 common 3-D objects as quickly and as accurately as possible. Naming accuracy was 99%, and the modal response time was only about 2 seconds, indicating excellent processing efficiency by the haptic system in terms of high accuracy combined with high speed.

However, unlike in the case of Braille text for which commercially available devices such as Braille-Note BT32 personal organizer have been widely used, the abovementioned studies have not converged to any widely adopted haptic system or technique. Currently, various types of tactile graphics are used in rendering images. Popular ways of doing this in existing practice include those relying on tactile embossers, swell paper, or thermoform. Tactile embossers such as the Tiger printers from ViewPlus (www.viewplus.com) render graphics by raised-lines that are formed by the striking pins of the printer. Swell-paper-based rendering utilizes heat sensitivity of microcapsules in the paper to create a raised-ink image. Thermoform uses a technique of molding plastic into a matrix, forming a relief model with a vacuum press and high temperature.

Even though various types of tactile graphics techniques are currently commonplace, a wide range of challenges remains to be addressed. First, the techniques described above have only limited resolution and relief variation. This in turn requires an image to be heavily simplified—and often re-created—before it can be rendered. In the existing practice, this process is largely done manually by sighted transcribers on an ad hoc, per-image basis. Since the images in STEM classes are so diverse, it remains a challenge to establish proper procedures for this critical step in the tactile rendering of an image.

Second, the use of tactile images requires that the user learn how to interpret this format, especially when the task is to learn something that cannot be easily conveyed by words. Although the visually-impaired regularly interact with tactile surfaces, their focus has not been towards interpreting image information. This presents a new challenge in developing a successful tool for the blind, because it is not known what the appropriate format is of the specific details that are distinct and easily identifiable in the image. Furthermore, those who use touch to perceive their environment do so by feeling the shape, surface and size of an object. This perception is not the same as being able to interpret what an object represents. As with any image, it is always harder to identify something that the student have little or no prior experience with, which is another consideration when determining how well a tactile image is being interpreted.

Third, images are in general a two-dimensional (2D) representation of a three-dimensional (3D) object. Those who are visually-impaired, especially from an early age, have limited perception of image depth, because they have not had the development of spatial relationships like those who can see. Thus, the ability to interpret a given 3D tactile image in its context may vary from one individual to another, depending on factors like the degree of exposure to such medium in the past, whether the individual had sight before, etc. This suggests that an optimal solution may need to be person-adaptive, which is a challenge that has not been addressed in the existing practice. While there are some known parameters that have been determined in the literature regarding proper tactile rendering, one can recognize the many remaining challenges that have been identified above.

Therefore, there is a need to overcome these challenges, by providing assistance to blind or visually-impaired students, and by developing new tools and methodologies that will allow them to sense and "visualize" 3D images. This would help remove one of the obstacles encountered by students that is preventing them from enrolling into vision-based classes or pursuing a career in STEM. The development of improved technology requires that one thoroughly evaluate the current tools, develop and optimize new tools, and understand what is needed to create an interpretable tactile image as well as collect information on how visually-impaired or blind students best learn how to utilize these tools.

SUMMARY OF THE INVENTION

In one aspect, the invention provides a tactile display system including an array of pixels. Each pixel comprises a block of hydrogel that can reversibly move between a collapsed position and any of a plurality of swollen positions in response to an environmental stimuli. The environmental stimuli can be a change in light intensity, or an electric field change, or a temperature change, or a pH change, or an ion concentration change, or a chemical concentration change due to enzymatic activity, or any combination thereof. The hydrogel may comprise a polymer network and a solvent. The environmental stimuli can be a change in light intensity, and the block of hydrogel can be light sensitive.

In one version of the tactile display system, a separator grid defines a pixel separator between each pixel. The separator grid can be a thermal insulator. In one form, the separator grid does not transmit light. The separator grid may isolate adjacent pixels from the environmental stimuli.

The array of pixels can be arranged in an enclosure with a top surface of each pixel facing away from the enclosure. When each pixel is in its collapsed position, the top surfaces of the pixels can form a flat touch surface, and when at least one pixel is in its swollen position a touch surface with elevation can be formed. When each pixel is in its swollen position, the top surfaces of the pixels can form a flat touch surface, and when at least one pixel is in its collapsed position a touch surface with elevation can be formed.

The tactile display system can further include a processor in electrical communication with each pixel. The processor can store optical image data and initiate application of the environmental stimuli to at least some of the pixels based on the optical image data. The processor can store optical image data and apply an electric field to at least some of the pixels based on the optical image data.

The tactile display system can further include a receiver for acquiring optical image data from an optical image display, and a processor in electrical communication with the receiver and each pixel. The processor can process the optical image data and initiate application of the environmental stimuli to at least some of the pixels based on the optical image data. In one version, the processor processes optical image data and applies an electric field to at least some of the pixels based on the optical image data. The processor can vary the electric field applied to at least some of the pixels based on changes in the optical image data such that at least some of the hydrogel blocks move between their collapsed position and one of the plurality of swollen positions, or between two of the plurality of swollen positions, or between one of the plurality of swollen positions and its collapsed position.

The tactile display system can further include an optical image displaying device in optical communication with the array of pixels, wherein changes in optical image data from the optical image displaying device are optically communicated to the hydrogel blocks such that at least some of the hydrogel blocks move between their collapsed position and one of the plurality of swollen positions, or between two of the plurality of swollen positions, or between one of the plurality of swollen positions and its collapsed position. The optical image displaying device can be a mobile computing device.

In one version of the tactile display system, each pixel comprises a solvent reservoir attached to the block of hydrogel. The solvent reservoir can comprise an inert hydrogel. The inert hydrogel can be transparent. In one form, the inert hydrogel is not sensitive to light or temperature. The inert hydrogel can be fully swollen.

The solvent reservoir can comprise a light intensity amplifier embedded in a hydrogel. The light intensity amplifier can include a light sensitive diode for sensing light from an image on an optical display, and a light emission diode to activate movement of the hydrogel. The light intensity amplifier can include serpentine interconnects between diodes. The solvent reservoir can be packaged in a polymer coating, such as a parylene coating.

In one version of the tactile display system, the block of hydrogel is packaged in a polymer coating, such as a parylene coating. The polymer coating can have an accordion shape near a perimeter of the block of hydrogel. The polymer coating can have a wavy shape within a perimeter of the block of hydrogel.

In another aspect, the invention provides a method for fabricating a tactile display system. The method can include the steps of (a) forming a first chamber containing a hydrogel that can reversibly move between a collapsed position and any of a plurality of swollen positions in response to an environmental stimuli; (b) forming a second chamber containing a second hydrogel suitable as a solvent reservoir; (c) bonding the first chamber to the second chamber to create a first pixel; (d) repeating steps (a) to (c) one or more times to create one or more additional pixels; and (e) creating an array of the first pixel and each additional pixel thereby forming the tactile display system.

In one version of the method, step (a) comprises packaging the first chamber in a polymer coating. In one version of the method, step (a) comprises forming the polymer coating with an accordion shape near a perimeter of the block of hydrogel. In one version of the method, step (a) comprises forming the polymer coating with a wavy shape within a perimeter of the block of hydrogel. In one version of the method, the polymer coating comprises a parylene. In one version of the method, the environmental stimuli is a change in light intensity, and the block of hydrogel is light sensitive.

In one version of the method, step (b) comprises embedding a light intensity amplifier in the second hydrogel. The light intensity amplifier can comprise a light sensitive diode for sensing light from an image on an optical display, and a light emission diode to activate movement of the hydrogel. In one version of the method, step (b) comprises forming serpentine interconnects between diodes. In one version of the method, step (b) comprises packaging the second chamber in a polymer coating, such as a parylene coating.

The invention provides a responsive dynamic 3D interface device to communicate between person and information. The device uses a hydrogel. The surface of the interface provides real-time 3D topological shape changes according to the input information, such as image brightness, color map and the like. The purpose is to produce a tactile and 3D topological interface for people to catch the information in the texts, images and videos. One key application is to assist the learning experience of visually impaired people. However, further applications may include a tactile gaming interface, and a refreshable 3D topological display.

The interface device can be: (1) a stand-alone electronics device, or (2) a 3D smart skin for portable electronics. The interface can be made with a stimulus sensitive hydrogel. The possible stimuli include, but are not limited to, heat, light, electrical field, and pH value. The device includes a pixel array. After processing the input optical image data and converting the data to related stimulus for every individual hydrogel pixel, the individual pixels will raise (or reduce) their heights proportional to the value of stimulus, and topological surface profile then will be created.

Traditionally, a keyboard and an optical display are the major interface between a human and electronics devices. A keyboard provides on-off buttons for inputting, and an optical display provides the confirmation and response from the devices. However, this traditional interface has fundamental limitations. For example, visually impaired people are not able to catch the image information for the display screen. Voice systems have been developed to provide visually impaired people a tool to descriptively read the screen; however, it is not effective and accurate. A majority of image information is not able to be converted to voice for visually impaired people.

Furthermore, visually impaired people have very limited resources to study and understand the contents in a book and any other visible material formats. Although some tactile reading and image materials are available, they are simplified too much with only on-off binary pixel status, which heavily limits the information converting capability. Therefore, an alternative interface, which can provide visually impaired people with more information on texts, images and even videos is well desired. The present invention of a responsive 3D tactile display is this type of interface.

Moreover, this invention will be also useful for people without vision impairment. Not only will a 3D rendered topography feature provide additional information compared with a 2D image display, but the tactile 3D display can integrate different sensing functions, such as force and movement from human figures, as a dynamic and interactive input interface between people and consumer electronics. A gaming machine interface is one of the typical examples. Another example is in the case where an air force fight jet pilot loses vision; this interface could provide a survival tool to control the plane.

The invention provides a dynamic 3D tactile hydrogel display. The 3D tactile displays will impact the ability to educate those with total or partial visual disabilities. All prior 3D tactile surfaces discussed above are static. Whenever the image is changed, the 3D display has to be completely replaced. This invention uses a stimulus sensitive hydrogel to realize a 3D dynamic and refreshable tactile display with multiple levels of varying height. To produce a 3D dynamic tactile display with multiple level height variation, the device satisfies the following features: (1) adaptive to different images with different gray-scale levels and color patterns, and with the ability to have tunable pixel height; (2) responsive and refreshable, which requires that the materials are sensitive to input stimuli, and able to generate reversible deformation; and (3) fast deformation to generate a 3D display. The technology that satisfies these requirements is a hydrogel, which is an aggregate of polymers and solvent molecules, so that when pixels absorb or repel the solvent, the hydrogel surface can generate a large and reversible deformation. The volume of this substance can be changed up to several hundred times. The hydrogel used in a 3D tactile display according to the invention is sensitive to at least one of different types of stimuli, including temperature, pH, ions, electric field, enzymes, and light.

Depending on the chemical composition of the hydrogel, the response time of pixel deformation can be as short as less than a second to a few seconds and span a minimum distance of less than a millimeter to several millimeters. These characteristics make hydrogel an ideal pixel material in a dynamic 3D display according to the invention that can assist individuals with visual disabilities to "visualize" pictorial information.

A refreshable 3D tactile hydrogel array according to the invention includes: (1) a stand-alone display with an integrated information converting mechanism, such as a mobile computing device, but has a tactile output; and (2) a display skin, that when attached to an image display screen will convert the image into a 3D tactile topography. Both versions of the invention can provide a 3D projected surface allowing for tactile interaction.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Two non-limiting examples of tactile display devices according to the invention are described herein. The first example device is a hydrogel based tactile display skin, which can be placed over any 2D optical display device such as a mobile computing device. The tactile display skin uses the emission from the optical display screen, and produces the corresponding stimulus (such as light or heat) to generate a 3D tactile surface on a finite time-scale, so that people (such as blind students) can interpret the image.

The second example tactile display device is a separate hydrogel pixel array that takes signals from text, image or video files and directly converts the signals to related stimuli signals that stimulate the hydrogel pixels to raise or reduce the height thereby creating a 3D tactile display.

The 3D dynamic tactile display system may include three major modules: (1) a 3D dynamic tactile display shape changing module, (2) a signal and data input and processing module, and (3) an optical information acquisition module. A stand alone device according to the invention does not include module (3), and for certain devices including an optical hydrogel, module (2) may not be needed, and module (1) and (3) can be combined. The fabrication and manufacture of module (2) can be based on optical display input, computing, and processing technology. The module (1) may be fabricated with hydrogel. An enclosure can package a full system including hydrogel pixels, stimulation components, and a solvent. A stimulation unit can be the components which produce certain stimulus or stimuli, such as heating, cooling, electrical field, pH value and optical signal. Module (3) can be an array of optical sensors to gather emission light information from an attached optical display and convert them to electrical signal output for transfer to module (1).

One specific example 3D tactile display is a smart skin structure based on an optically sensitive hydrogel. A sheet of optical hydrogel with a soft enclosure (including solvent) can be put on top of an optical display. The light from optical display will be caught by the hydrogel to stimulate it. With different light intensities at different locations, the swelling (or shrinking) ratio changes, thereby forming a 3D topography shape on the top surface. It is a self-responsive smart skin.

Figure 1:
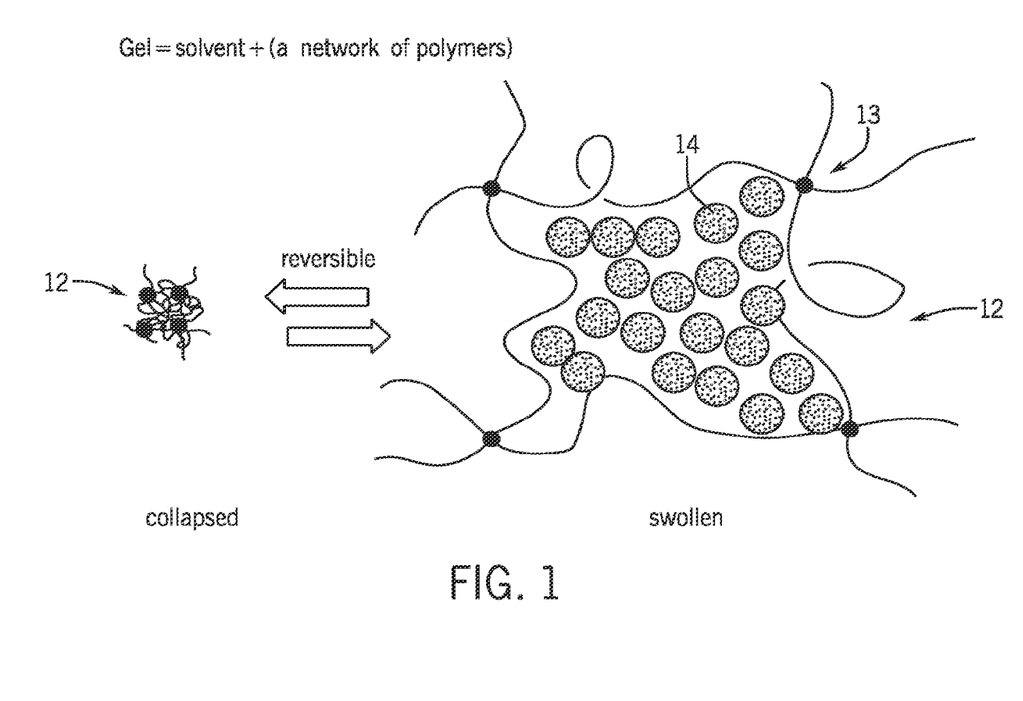
FIG. 1 is a schematic showing how a hydrogel reversibly moves between a collapsed position and a swollen position.

Turning now to FIG. 1, there is shown a schematic illustrating how a hydrogel 12 reversibly moves between a collapsed position and a swollen position. The hydrogel 12 includes a polymer network 13 and a solvent (e.g. water) 14. An environmental stimuli can cause the hydrogel to shrink or swell. Example environmental stimuli that can cause the hydrogel to shrink or swell include temperature (heating or cooling), pH, ions, enzymes, electric field, and light.

Figure 3:
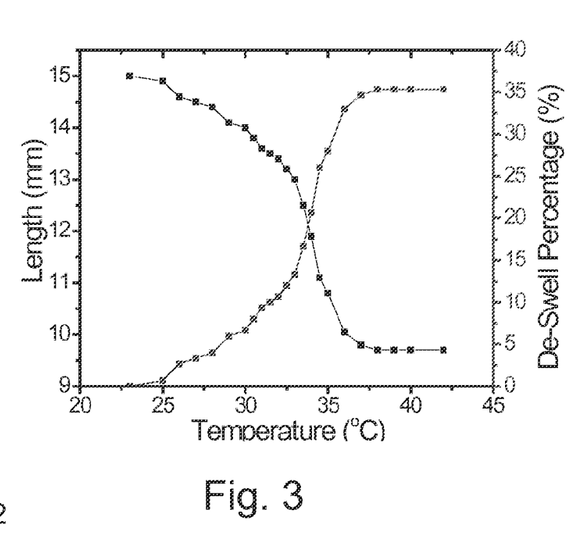
FIG. 3 shows the swelling behavior of two different temperature sensitive hydrogels.

For example, temperature-sensitive hydrogels may increase or decrease their water-solubility as the temperature increases. Certain hydrogels can display negative (inverse) temperature-dependence where the hydrogel shrinks as the temperature increases. In contrast, other hydrogels can display positive temperature-dependence where the hydrogel swells as the temperature increases. A non-limiting example of a hydrogel having a negative temperature-dependence of swelling is an interpenetrating polymer network of poly(N-isopropylacrylamide) and poly(tetramethyleneether glycol). A non-limiting example of a hydrogel having a positive temperature-dependence of swelling is an interpenetrating polymer network of poly(acrylic acid) and poly(acrylamide). FIG. 3 compares a hydrogel with negative temperature-dependence of swelling and a hydrogel with positive temperature-dependence of swelling, and shows examples of a hydrogel swelling ratio/temperature relationship.

A pH sensitive hydrogel can shrink or swell depending on pH. For example, hydrogels made of poly(methacrylic acid) grafted with poly(ethylene glycol) have pH-sensitive properties. At low pH, shrinkage of the hydrogel occurs. At high pH, swelling of the hydrogel occurs.

The environmental stimuli causing the swelling or collapsing in FIG. 1 can be a chemical concentration change due to enzymatic activity. For example, glucose oxidase oxidizes glucose to gluconic acid which causes a pH change that controls shrinking or swelling a pH sensitive hydrogel such as noted above.

The environmental stimuli causing the swelling or collapsing in FIG. 1 can be an ion concentration change. For example, a nonionic poly(N-isopropylacrylamide) hydrogel can exhibit a sharp volume transition at a critical concentration of sodium chloride in water.

The environmental stimuli causing the swelling or collapsing in FIG. 1 can be an electric field. Electro-sensitive hydrogels undergo shrinking or swelling in the presence of an applied electric field. The electrode providing the electric field can be in contact with the polymer network, or in contact with the solvent without touching the polymer network. One non-limiting example electro-sensitive hydrogel is a hydrogel made of sodium acrylic acid-acrylamide copolymer in an electrolyte solution. This hydrogel can swell when an electric field in applied.

The environmental stimuli causing the swelling or collapsing in FIG. 1 can be light. One non-limiting example is that visible light-sensitive hydrogels can be prepared by adding a light-sensitive chromophore (e.g., trisodium salt of copper chlorophyllin) to a hydrogel having a positive temperature-dependence of swelling. When light is applied to the hydrogel, the chromophore absorbs light which is then dissipated as heat and the increase in temperature of the hydrogel causes swelling of the thermosensitive hydrogel as explained above.

Figure 2A:
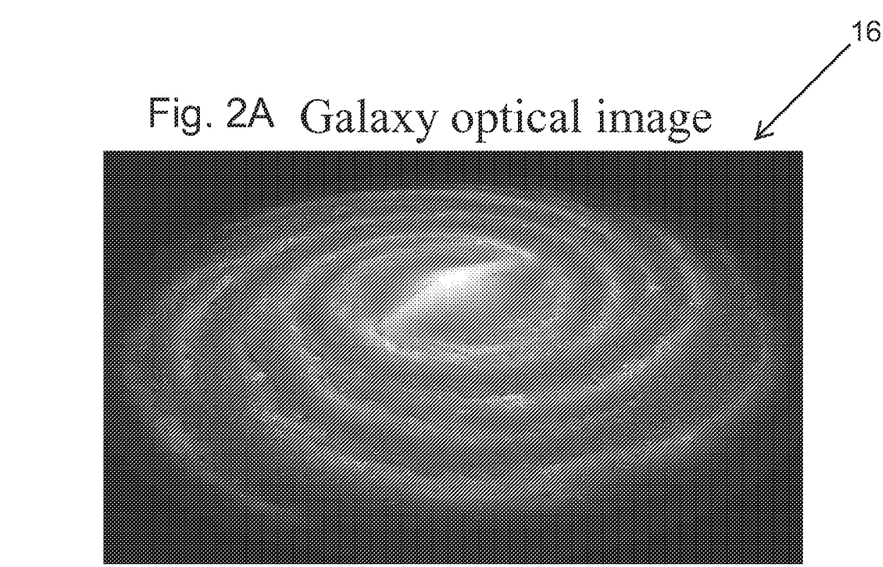
FIG. 2A shows an optical image of a galaxy.
Figure 2B:
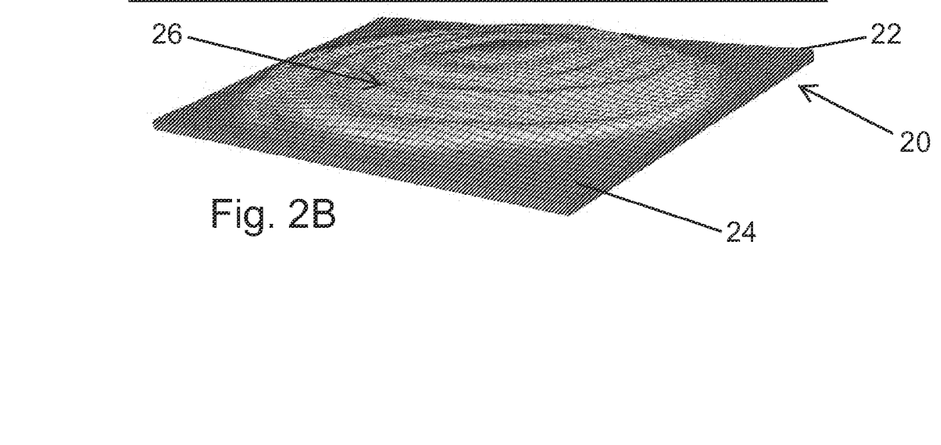
FIG. 2B shows a tactile display according to the invention providing a tactile surface corresponding to the optical image of FIG. 2A.

Turning now to FIGS. 2A and 2B, operation of one example tactile display according to the invention can be described. The tactile display uses 3D height level to demonstrate the light intensity of an optical image. FIG. 2A shows an optical image 16 of a galaxy. This optical image 16 can be displayed on the monitor or display screen of any of a variety of known computing devices. This optical image 16 comprises an array of pixels as is known in the art. In FIG. 2B, there is shown an example tactile display according to the invention. The tactile display includes an array 20 of pixels 22. The pixels 22 can comprise a light-sensitive hydrogel that swells or collapses as shown in FIG. 1. When the array 20 of pixels 22 is placed over the optical image 16, each of the light-sensitive hydrogel pixels 22 absorbs light from an aligned pixel from the optical image 16. Higher light intensity pixels of the optical image 16 transfer more light to the aligned light-sensitive hydrogel pixel 22, and lower light intensity pixels of the optical image 16 transfer less light to the aligned light-sensitive hydrogel pixel 22. The light-sensitive hydrogel pixels 22 swell a distance away from the optical image 16 depending on the intensity of light received from the optical image 16. This creates a three dimensional touch surface 24 with elevations 26 that depend on the intensity of light received from the pixels of the optical image 16. Thus, FIGS. 2A and 2B show modeling of a 3D tactile display based on a light/temperature sensitive hydrogel.

Figures 4A, 4B:
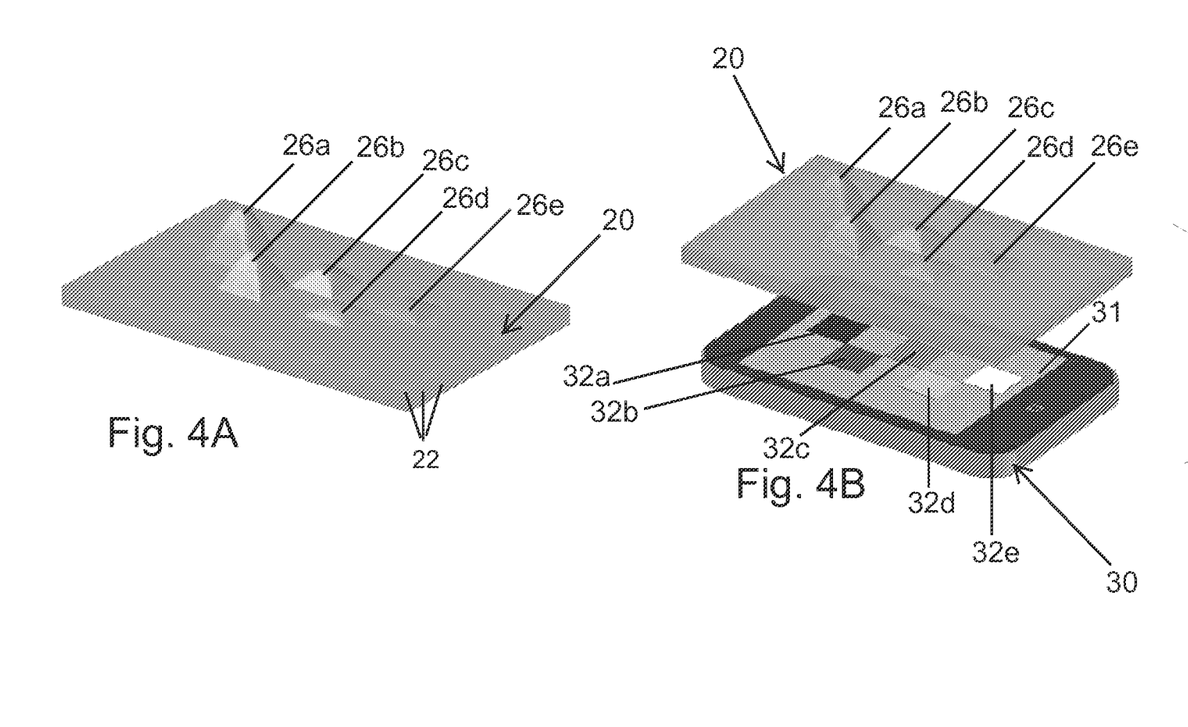
FIG. 4A is a perspective view of an array of hydrogel pixels of a tactile display according to the invention.
FIG. 4B is an exploded perspective view of an array of hydrogel pixels being coupled to a mobile computing device having an optical image display screen.

FIG. 4A shows one example of a responsive 3D dynamic tactile display which is a stand-alone system. The image information is input in an electric file format. An internal data and computing unit will process the data and then the 3D tactile display will demonstrate the topography shape, i.e., elevations 26a, 26b, 26c, 26d and 26e, whose height depends on the converted information. This responsive 3D dynamic tactile display produces a response signal from surface touch, provided by human fingers.

FIG. 4B shows another example of a responsive 3D dynamic tactile display. This dynamic tactile display is a smart skin attached on top of any normal optical display surface. The optical light emitted from optical display will be the input for the smart skin, which will convert to the light to a 3D topography shape on a tactile display. In one embodiment, a mobile computing device 30 has an optical image display screen 31 displaying squares 32a, 32b, 32c, 32d and 32e emitting different intensities of light. When the array 20 of pixels 22 is placed over the optical image display screen 31 of the mobile computing device 30, displayed squares 32a, 32b, 32c, 32d and 32e create corresponding elevations 26a, 26b, 26c, 26d and 26e whose height depends on the intensity of light received from the optical image display screen 31. This responsive 3D dynamic tactile display also produces a response signal from surface touch, provided by human fingers.

Figure 5:
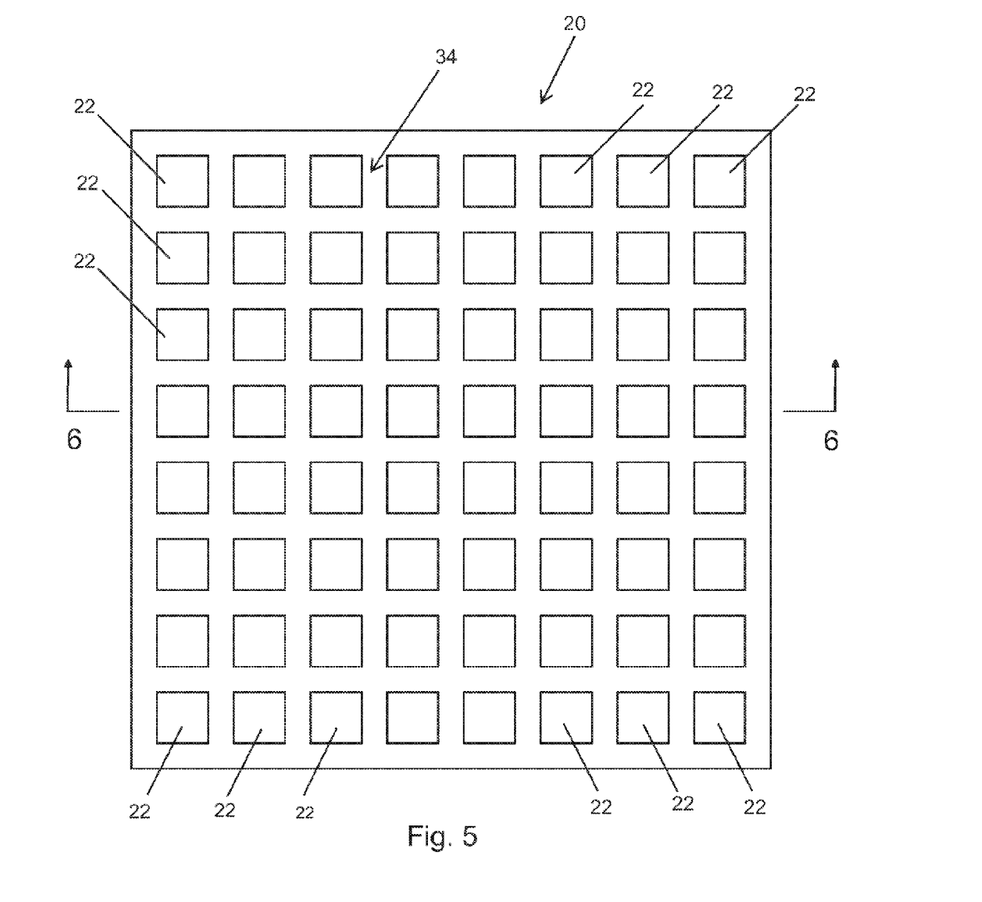
FIG. 5 is an enlarged top plan view of an array of hydrogel pixels according to the invention.
Figure 6:
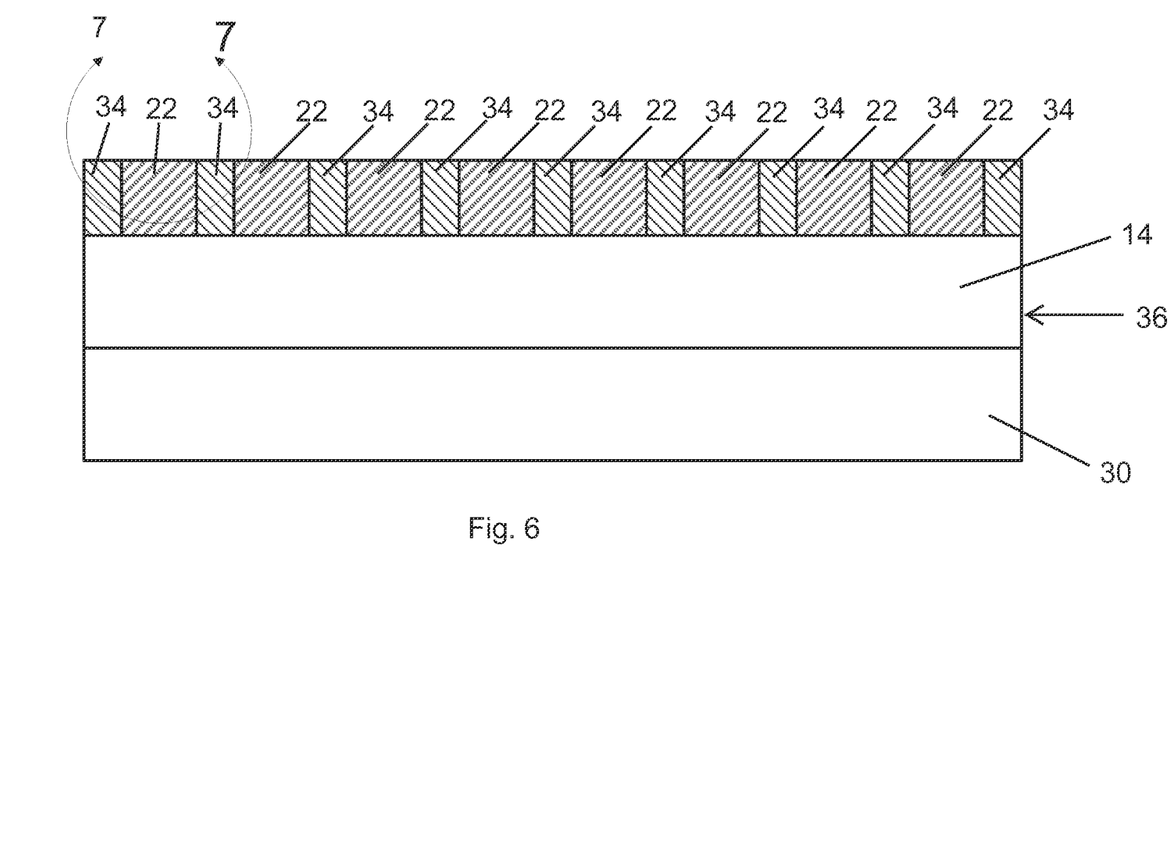
FIG. 6 is a cross-sectional view of the array of hydrogel pixels of FIG. 5 taken along line 6-6 of FIG. 5.
Figure 7:
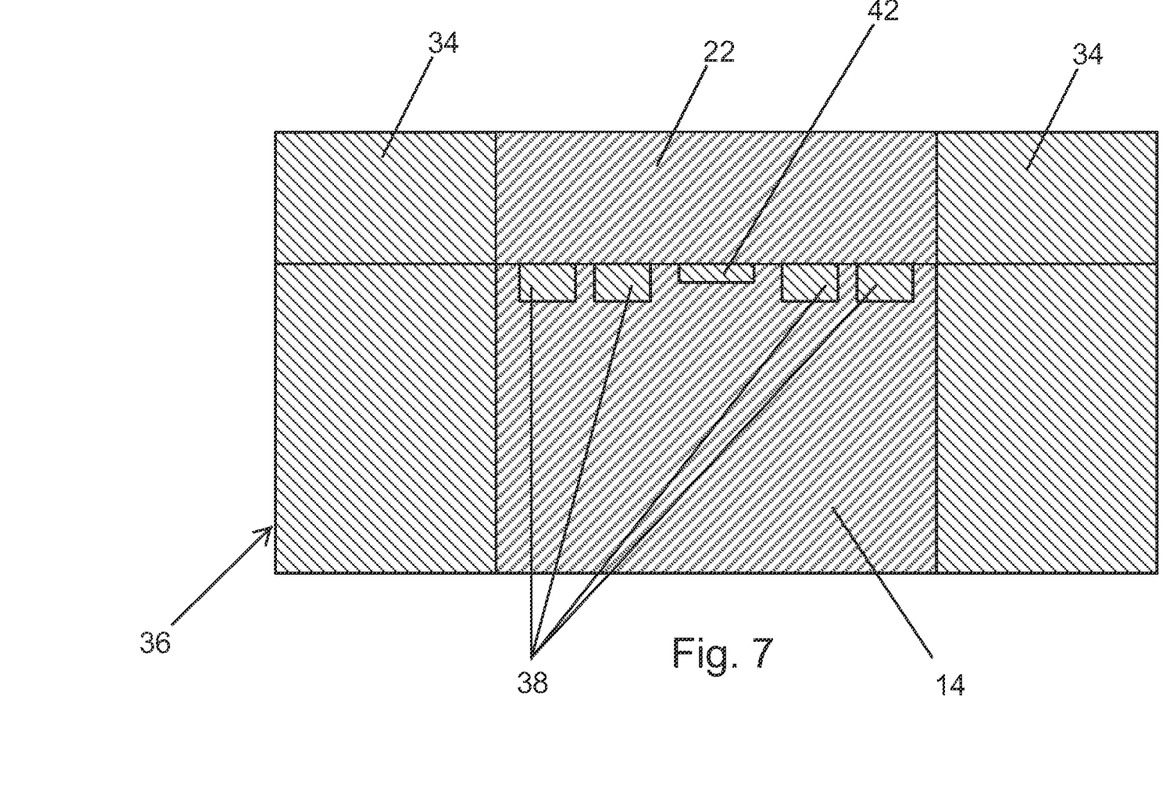
FIG. 7 is a detailed cross-sectional view of the array of hydrogel pixels of FIG. 5 taken along line 7-7 of FIG. 6.

Referring now to FIGS. 5 to 7, another example tactile display according to the invention is shown in greater detail. The pixels 22 comprise a square cuboid or rectangular cuboid hydrogel block, and the plurality of pixels 22 are arranged in a separator grid 34. Other shapes for the hydrogel blocks are also suitable. The separator grid 34 is designed to isolate each individual hydrogel pixel 22 to avoid crosstalk and improve stimulation efficiency. For example, when heat is used to drive a temperature sensitive hydrogel block, a well constructed thermal insulation separator grid 34 is used between pixels 22 to avoid thermal transfer between pixels 22. When light is used to drive a light-sensitive hydrogel block, a light blocker is beneficially used between adjacent pixels 22. It should be understood that an 8-by-8 array is shown for ease of illustration in FIG. 5, and that the array 20 of pixels 22 can include more or less pixels.

The array 20 of pixels 22 can be arranged in an enclosure 36 to contain hydrogel and a solvent 14, and the enclosure 36 can be coupled to a mobile computing device 30 (see FIG. 6). The solvent 14 may be water; however, certain environmental stimuli sensitive hydrogels work best in other solvents. For example, electro-sensitive hydrogels may work in an electrolyte solution as detailed above.

Looking at FIG. 7, a single tactile display pixel 22 of the array 20 is shown. Optional baffles 38 may be arranged between the solvent 14 and the hydrogel pixel 22 to control solvent flow to the hydrogel pixel 22. A stimulation component 42 can be placed in contact with the hydrogel pixel 22, or the solvent 14, or both the solvent 14 and the hydrogel pixel 22. For example, the stimulation component 42 may be an electrode that applies an electric field to the solvent 14 and/or an electro-sensitive polymer network 13 of the hydrogel block of the pixel 22.

Another tactile display system according to the invention can include a light acquisition unit in place of the mobile computing device 30. For example, a receiver, such as a image sensor or light sensitive diode, can acquire optical image data from an optical image display (or from any object). A processor, such as a microprocessor, is in electrical communication with the receiver. The processor processes the optical image data received from the receiver and applies an electric field by way of an electrode to at least some of the pixels 22 based on the optical image data. The processor varies the electric field applied to at least some of the pixels based on changes in the optical image data such that at least some of the hydrogel blocks move between their collapsed position and one of a plurality of swollen positions, or between two of the plurality of swollen positions, or between one of the plurality of swollen positions and its collapsed position. Continuous changes in electric field cause reversible swelling and deswelling of the pixels 22.

Yet another tactile display system according to the invention can include a processor in electrical communication with each pixel 22. The processor, such as a computer, stores optical image data and applies an electric field to at least some of the pixels 22 based on the stored optical image data. Suitable software can allow for a choice of the optical image data that applies the electric field to at least some of the pixels 22.

Figure 8:
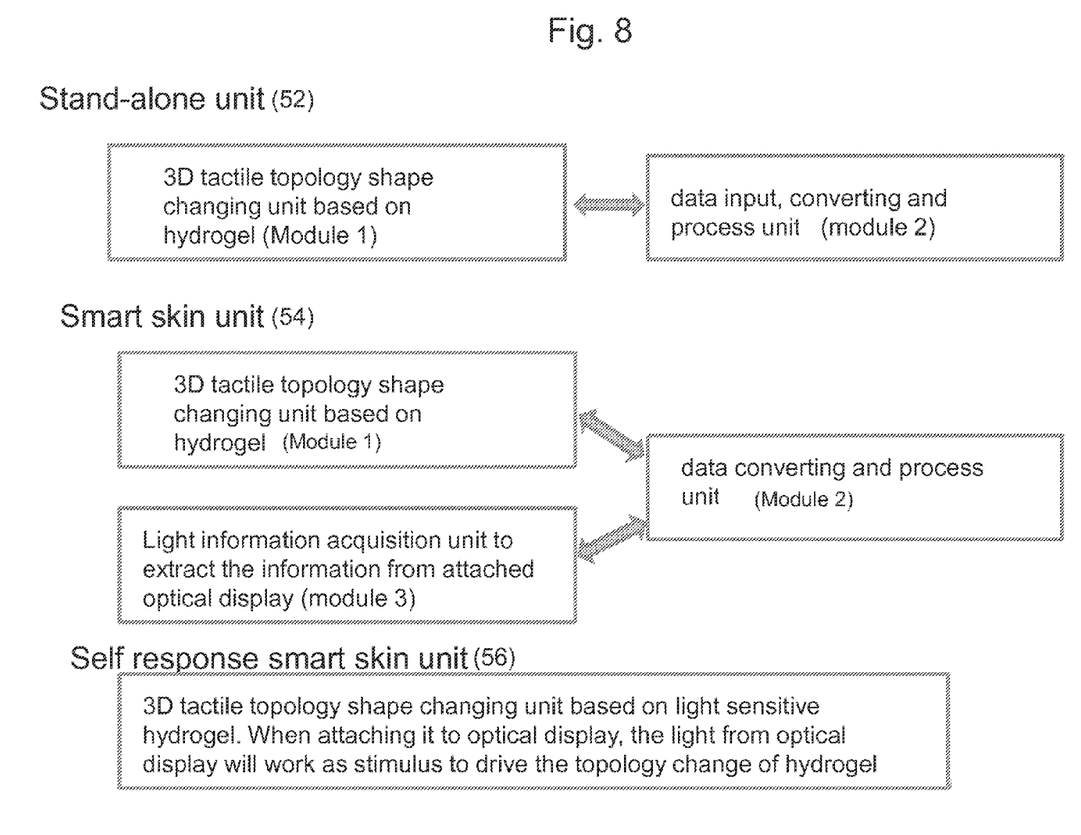
FIG. 8 is a block diagram of three embodiments of a tactile display according to the invention.

Turning now to FIG. 8, three example embodiments of a tactile display according to the invention are described. A stand alone unit 52 can include: (i) a 3D tactile topography shape changing unit based on hydrogel (Module 1—e.g., the hydrogel block pixels 22 arranged in a separator grid 34), and (ii) a data input, converting and process unit (Module 2—e.g., a processor that stores optical image data and initiates application of an electric field or other environmental stimuli to the pixels 22).

A smart skin unit 54 can include: (i) a 3D tactile topography shape changing unit based on hydrogel (Module 1—e.g., the hydrogel block pixels 22 arranged in a separator grid 34), and (ii) a data input, converting and process unit (Module 2—e.g., a processor that stores optical image data and initiates application of an electric field or other environmental stimuli to the pixels 22), and (iii) a light information acquisition unit to extract the information from an attached optical display (Module 3).

A self response smart skin unit 56 includes a 3D tactile topography shape changing unit based on a light sensitive hydrogel. When attaching it to an optical display, the light from optical display will work as environmental stimuli to drive the topography change of hydrogel pixels.

Tactile Display System Processing—There are three challenges to address for the tactile display system processing: (1) the need for a solvent reservoir with a fast response, (2) hydrogel/hard materials integration for light intensity enhancing, and (3) the need for a package allowing hydrogel swelling and deswelling. The following processing technologies tackle these challenges, namely an inert hydrogel integrated with light diodes for addressing challenges (1) and (2), and accordion bellow shaped wavy parylene (e.g., Parylene-C) for addressing challenge (3). FIGS. 9A to 14 illustrate example steps for fabricating a tactile display system module in a dimension of 1 inch by 1 inch. The example steps are presented for illustrative purposes only, and are not intended to limit the scope of the method of the present invention in any way.

Figures 9A, 9B, 9C:
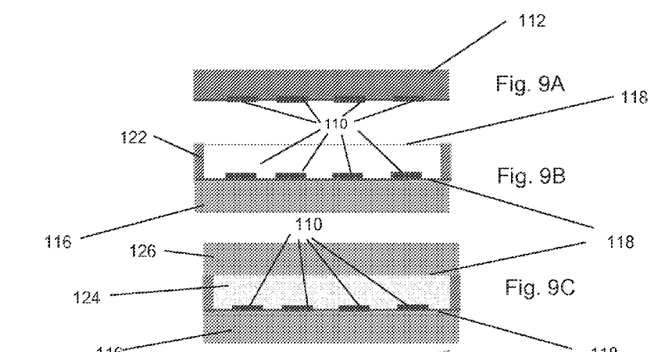
FIGS. 9A, 9B, 9C and 9D are cross-sectional views taken along line 9-9 of FIG. 10 showing steps in an example method according to the invention for forming a solvent reservoir suitable for use in a hydrogel pixel according to the invention.
Figure 9D:
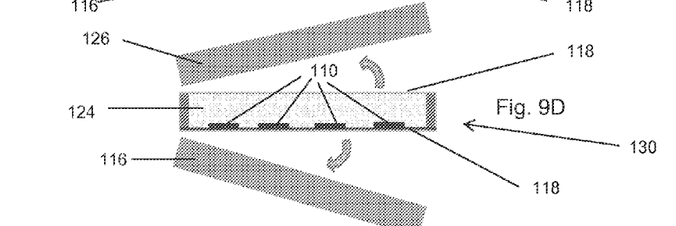
Figure 10:
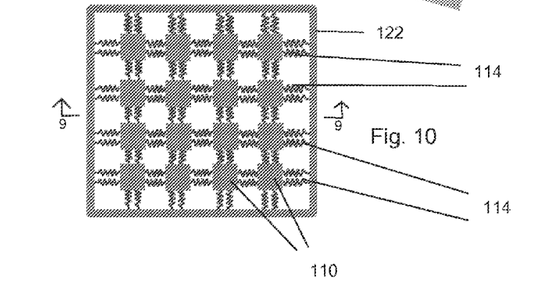
FIG. 10 is a top view of the solvent reservoir formed in the steps shown in FIGS. 9A to 9D.
Figure 11A:
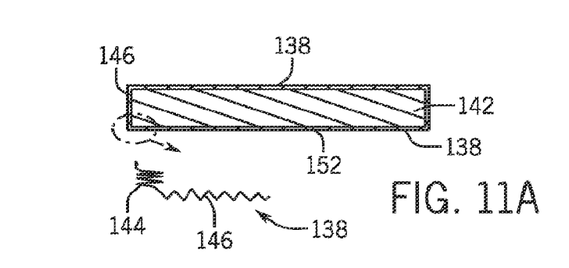
FIGS. 11A, 11B, and 11C are cross-sectional views in a direction similar to line 9-9 of FIG. 10 showing steps in an example method according to the invention for forming a photosensitive hydrogel component for use in a hydrogel pixel according to the invention.
Figure 11B:
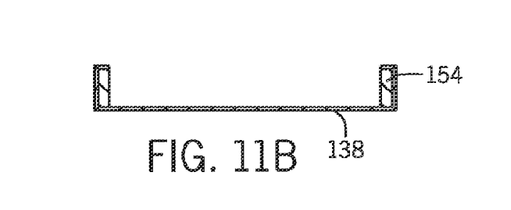
Figure 11C:
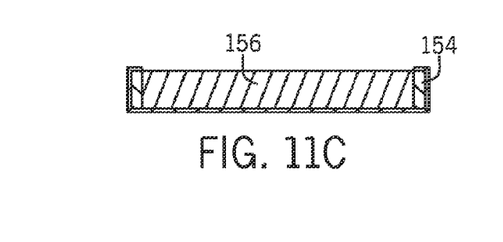

The formation of an inert hydrogel integrated with light diodes is shown in FIGS. 9A to 10. The processing starts with the fabrication of light intensity amplifier circuit blocks 110 on a silicon (Si) wafer 112 using a semiconductor industry process (see FIG. 9A). The light intensity amplifier circuit blocks 110 include a light sensitive diode for sensing the light from the image on an optical display, and a high intensity light emission diode to activate the light sensitive gels. Our results have verified that the localized hydrogel deformation can be triggered by hard materials. Serpentine shaped interconnects 114 (see FIG. 10) between the light diodes 110 are employed to survive possible in-plane strain during fabrication and practical handling. Then the Si wafer 112 is bonded with a handling wafer 116 through a thin Parylene-C layer 118, followed by deep reactive ion etching (DRIE) from the back side to form a silicon chamber 122 (see FIG. 9B). Parylene (poly(p-xylylene) C is a widely used polymer in MicroElectroMechanical systems (MEMS) and biomedical devices, which is water proof, transparent and electrical insulating. As shown in FIG. 9C, the chamber 122 is used as a container for an inert hydrogel 124 (e.g., a polyethylene glycol hydrogel that is transparent and not sensitive to light or temperature, serving as solvent reservoir). The inert hydrogel 124 is poured in and cured to a fully swollen state, and then bonded with another handling wafer 126 with a parylene layer 118 on it. As shown in FIG. 9D, this is followed by removing the top handling wafer 126 and the bottom handling wafer 116 to form a solvent reservoir 130. Thus, the steps shown in FIGS. 9A to 10 realize the function of a solvent reservoir (through fully swollen inert gels) for fast response, and light diodes for light intensity enhancing.

Figure 12:
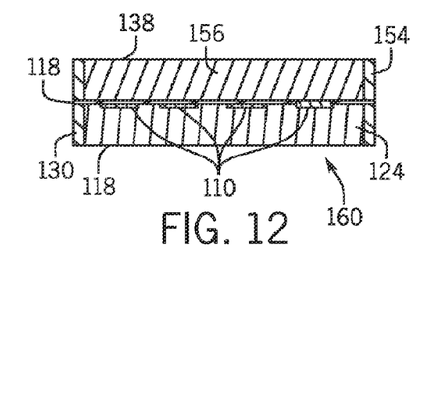
FIG. 12 is a cross-sectional view in a direction similar to line 9-9 of FIG. 10 showing a hydrogel pixel formed according to the example method of the invention shown in FIGS. 9A to 11C.
Figure 13:
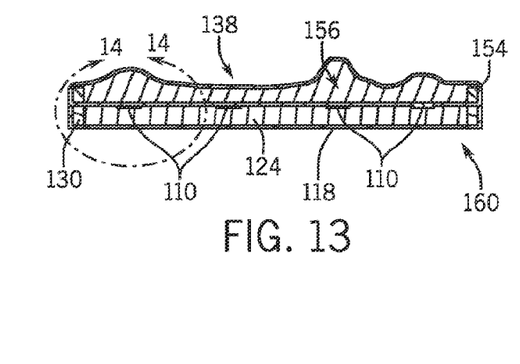
FIG. 13 is another cross-sectional view similar to FIG. 12 of a hydrogel pixel formed according to the example method of the invention shown in FIGS. 9A to 11C.
Figure 14:
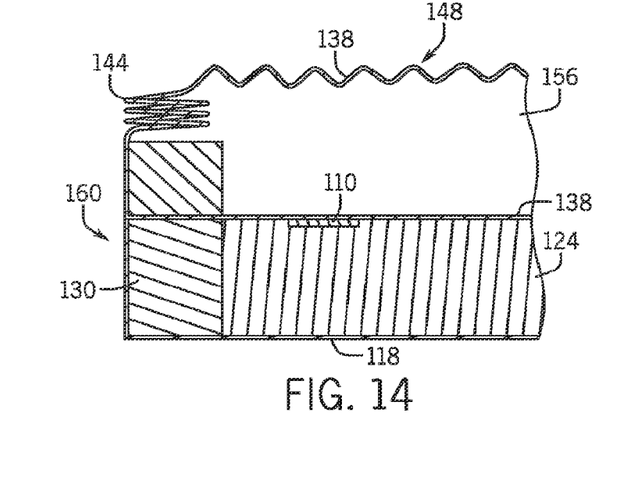
FIG. 14 is a detailed cross-sectional view of the hydrogel pixel of FIG. 13 taken along lines 14-14 of FIG. 13.
Figure 15:
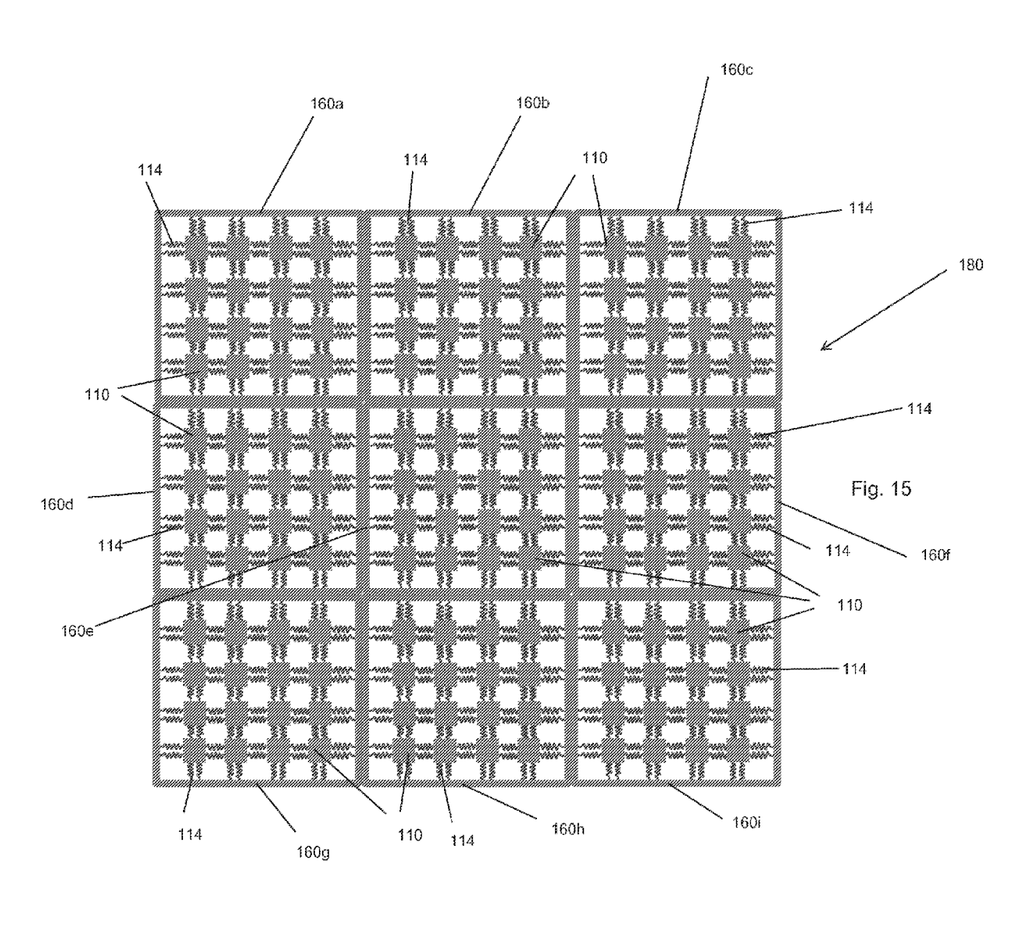
FIG. 15 is a top view of an example tactile display system created using nine hydrogel pixels formed according to the example method of the invention shown in FIGS. 9A to 11C.

The formation of a package allowing light sensitive hydrogel swelling and deswelling is shown in FIGS. 11A to 14. The packaging fulfills two functions, namely (a) hard enough to confine the mechanical integrity of the tactile display system containing light sensitive gels, and (b) soft enough to allow the hydrogel to deform freely in a desired dimension. To resolve this dilemma, we use accordion bellow shaped wavy Parylene-C for packaging. The fabrication starts by depositing a parylene layer 138 on surfaces of a silicon wafer 142 with a bellow structure 144 at the edge 146 of the silicon wafer 142 and a wavy structure 148 on a surface 152 bounded by the edge 146 (see FIG. 11A). At the edge 146 of the Si wafer 142, Parylene-C is in an accordion bellow shape structure 144 to allow free expansion of the parylene layer 138 in the vertical direction, which can be realized by etching out metal from metal/Parylene-C/metal/Parylene-C layers (fabricated by alternatively deposition of metal and Parylene C). To allow the parylene layer 138 to deform in the in-plane direction (horizontal in FIG. 11A), the wavy shaped structure 148 of parylene layer 138 is used through conformal deposition of Parylene-C on the Si wafer 142 with a wavy surface profile. The wafer 142 is etched to form a silicon chamber 154 (see FIG. 11B). Then, a light sensitive hydrogel 156 is polymerized in this chamber 154 (see FIG. 11C). Turning to FIG. 12, the solvent reservoir 130 with inert hydrogel 124 (see FIG. 9D) and the chamber 154 with the photosensitive hydrogel 156 are bonded together as shown in FIGS. 12 to 14. In one non-limiting example form, the chamber 130 and the chamber 154 are bonded together for a full display module 160 with dimensions 1"×1" to 2" to 2" and 0.4 to 1 centimeters thick. FIG. 15 shows an example tactile display system 180 with a 3×3 array of modules 160a, 160b, 160c, 160d, 160e, 160f, 160g, 160h, and 160i.

EXAMPLE

High-density plastic board 3D tactile images were introduced in astronomy labs at Arizona State University so that blind or visually impaired (BVI) students could "sense" or "visualize" the information contained in any 2D images and start fully participating in STEM education. During specific astronomy labs, information was systematically collected through a survey system to evaluate and improve the quality of the tactile images. A case study of 8 blind or visually impaired and 7 sighted students at Arizona State University was also initiated. Static 3D tactile images were created using CNC machining as follows: (1) the gray scale of an image was used to create the relief height of the image with white being the tallest and black the lowest part of the tile image; (2) the images were then converted into .igs files in a software program called ARTCam; and (3) a CNC machine was used to drill the 3D-image out of a piece of high density plastic (HDP).

Researchers met with blind individuals at Arizona State University who have STEM background training, and presented them with a high-, medium- and low-resolution versions of the Butterfly Nebula. Also included was a version of the same Butterfly Nebula image created on a thermal printer. The thermally printed version did not provide enough detail to give the student a clear impression of the image. To test the effectiveness of the tiles, a series of fill-in-the-blank questions with 5 answers were placed in a rubric. Fifteen students (8 blind or visually impaired and 7 sighted students) could select the value of the tile from following descriptions: (1) No Value; (2) Usable; (3) Helpful; (4) Necessary; (5) Essential. The questions that were posed to the students were: (a) The 3D-tactile was/had—for understanding the topic of the lab; (b) The 3D-tactile was/had—to help me mentally see objects from the lab; and (c) The 3D-tactile was/had—when compared to verbal descriptions taught in the lab. Sixty-six percent of the tactile images were scored as "helpful" or "necessary", and twenty-three percent were rated "essential". None of the tactile images were rated as having "no value". The case study clearly demonstrated the power of 3D tactiles in helping BVI students better understand astronomy lab materials.

The 3D-tactile images clearly helped the BVI students learn STEM material from images. The student surveys show that the tactile images were regarded by the students as a significant contributor to their gained knowledge, regardless of any reported, negative comments. The fact that there was a tool to use that did not rely on auditory senses was very important to the students. It was also expected that there would be an improvement in all test scores. In fact, the second round of test scores was always higher than the first round, and improved as the study participants learned how to use the tactile images. Students that had the tiles in the second half of the study scored higher than their counterparts without tactile images. Quiz scores increased by as much as 60%.

This Example supports the case that visually impaired and blind students greatly benefit from even having still 3D tactiles. Therefore, it is expected that the movable 3D tactiles described herein will be far more powerful in teaching STEM materials to visually impaired and blind students.

Thus, the invention uses hydrogel blocks to produce a responsive 3D dynamic tactile display platform, which will convert text, an optical image, or video to a 3D topography surface in real-time. The potential applications include, but are not limited to visually impaired people and video gaming interfaces. The tactile display system: (i) is dynamic and refreshable real in time in contrast to current static 3D printing, (ii) has analog height or a multiple step of height tactile display in contrast to current on-off binary tactile displays, and (iii) has formats, i.e., stand-alone and smart skin, which are totally novel. The invention provides tactile and 3D topography information, which is totally different from current optical displays. It not only provides visually impaired people with a way to understand the world, but also supplies another dimension for all people to interface with machines.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for fabricating a tactile display system, the method comprising:
   (a) forming a first chamber containing a hydrogel that can reversibly move between a collapsed position and any of a plurality of swollen positions in response to an environmental stimuli;
   (b) forming a second chamber containing a second hydrogel suitable as a solvent reservoir;
   (c) bonding the first chamber to the second chamber to create a first pixel;
   (d) repeating steps (a) to (c) one or more times to create one or more additional pixels; and
   (e) creating an array of the first pixel and each additional pixel thereby forming the tactile display system.

2. The method of claim 1 wherein:
   step (a) comprises packaging the first chamber in a polymer coating.

3. The method of claim 2 wherein:
   step (a) comprises forming the polymer coating with an accordion shape near a perimeter of the block of hydrogel.

4. The method of claim 2 wherein:
   step (a) comprises forming the polymer coating with a wavy shape within a perimeter of the block of hydrogel.

5. The method of claim 2 wherein:
   the polymer coating comprises a parylene.

6. The method of claim 1 wherein:
   the environmental stimuli is a change in light intensity, and
   the block of hydrogel is light sensitive.

7. The method of claim 1 wherein:
   step (b) comprises embedding a light intensity amplifier in the second hydrogel.

8. The method of claim 7 wherein:
   the light intensity amplifier comprises light sensitive diode for sensing light from an image on an optical display, and a light emission diode to activate movement of the hydrogel.

9. The method of claim 7 wherein:
   step (b) comprises forming serpentine interconnects between diodes.

10. The method of claim 1 wherein:
    step (b) comprises packaging the second chamber in a polymer coating.

11. The method of claim 10 wherein:
    the polymer coating comprises a parylene.

* * * * *